(12) United States Patent
Denniss et al.

(10) Patent No.: US 9,784,237 B2
(45) Date of Patent: Oct. 10, 2017

(54) OCEAN WAVE ENERGY EXTRACTION

(76) Inventors: Tom Denniss, Randwick (AU); Scott Hunter, Glebe (AU)

( * ) Notice: Subject to any disclaimer, the term of this patent is extended or adjusted under 35 U.S.C. 154(b) by 615 days.

(21) Appl. No.: 13/061,697

(22) PCT Filed: Aug. 31, 2009

(86) PCT No.: PCT/AU2009/001128
§ 371 (c)(1),
(2), (4) Date: Mar. 1, 2011

(87) PCT Pub. No.: WO2010/022474
PCT Pub. Date: Mar. 4, 2010

(65) Prior Publication Data
US 2011/0203266 A1  Aug. 25, 2011

(30) Foreign Application Priority Data

Sep. 1, 2008  (AU) .................................. 2008904516
Feb. 23, 2009  (AU) .................................. 2009900774

(51) Int. Cl.
*F16D 31/02* (2006.01)
*F03B 13/14* (2006.01)
(Continued)

(52) U.S. Cl.
CPC .............. *F03B 13/142* (2013.01); *E02B 9/08* (2013.01); *F03B 13/24* (2013.01);
(Continued)

(58) Field of Classification Search
CPC .................................. F03B 13/24; F03B 13/20
(Continued)

(56) References Cited

U.S. PATENT DOCUMENTS 1,455,718 A  5/1923  Delong
2,593,491 A  4/1952  Saunders et al.
(Continued)

FOREIGN PATENT DOCUMENTS

CA  2286545  * 11/2000  .............. F03B 13/14
CA  2286545 A1  11/2000
(Continued)

OTHER PUBLICATIONS

Massey, B. S., "Mechanics of Fluids", Chapman & Hall, London, Sixth Edition, ISBN 0-412-34280-4.

*Primary Examiner* — Michael Leslie
*Assistant Examiner* — Daniel Collins
(74) *Attorney, Agent, or Firm* — Croce Law LLC; Bradley D. Crose

(57) ABSTRACT

An improved ocean wave energy extraction system is disclosed. The system includes at least one duct for receiving an oscillating water column. The duct has a first segment, a second segment arranged transversely to the first segment and a flow control segment intermediate the first and second segments. The flow control segment is configured to inhibit turbulent flow of the oscillating water column flowing within the duct. A turbine is in fluid communication with the second segment of the duct such that the turbine is driven by the fluid flow which is generated by the oscillations of the oscillating water column within the duct. The turbine rotates an electric generator to thereby generate electrical energy.

12 Claims, 5 Drawing Sheets

(51) Int. Cl.
*E02B 9/08* (2006.01)
*F03B 13/24* (2006.01)

(52) U.S. Cl.
CPC ........... *F05B 2240/40* (2013.01); *Y02E 10/32* (2013.01); *Y02E 10/38* (2013.01)

(58) Field of Classification Search
USPC ........ 60/398, 502, 497, 499; 405/76; 290/42
See application file for complete search history.

(56) References Cited

U.S. PATENT DOCUMENTS

| | | | |
|---|---|---|---|
| 4,253,032 A * | 2/1981 | Lochner | 290/53 |
| 4,675,536 A * | 6/1987 | Bellamy | 290/42 |
| 4,741,157 A * | 5/1988 | Nishikawa | F03B 13/142 290/53 |
| 4,858,434 A * | 8/1989 | Masuda | 60/398 |
| 5,770,893 A | 6/1998 | Youlton | |
| 6,253,700 B1 * | 7/2001 | Gorlov | 114/274 |
| 6,933,623 B2 * | 8/2005 | Carroll et al. | 290/42 |
| 2010/0007148 A1 * | 1/2010 | Davis et al. | 290/54 |

FOREIGN PATENT DOCUMENTS

| | | | |
|---|---|---|---|
| CN | 200989279 Y | 12/2007 | |
| CN | 101144458 A | 3/2008 | |
| CN | 101611226 A | 12/2009 | |
| EP | 0950812 A2 | 10/1999 | |
| EP | 950812 A2 | 10/1999 | |
| GB | 1572086 A | 7/1980 | |
| GB | 2325964 | 12/1998 | |
| JP | 63-277868 A2 | 11/1988 | |
| JP | 11-294311 A | 10/1999 | |
| WO | WO2005/095790 | * 10/2005 | F03B 13/14 |
| WO | WO-2005/095790 A1 | 10/2005 | |
| WO | WO 2006/011817 A1 | 2/2006 | |
| WO | WO 2008/047337 A1 | 4/2008 | |

* cited by examiner

OCEAN WAVE ENERGY EXTRACTION

This application is the National Stage of PCT International Application No. PCT/AU2009/001128 filed on Aug. 31, 2009, which claims priority under 35 USC §119(a)-(d) of Application No. 2008904516 filed in Australia on Sep. 1, 2008 and Application No. 2009900774 filed in Australia on Feb. 23, 2009.

FIELD OF THE INVENTION

This invention relates to sustainable energy generation. More particularly, the present invention relates to improvements in ocean wave energy extraction and to systems and methods therefore.

BACKGROUND TO THE INVENTION

Any discussion of the prior art throughout the specification should in no way be considered as an admission that such prior art is widely known or forms part of common general knowledge in the field.

Environmental concerns and the awareness of the finite resources of traditional combustible hydrocarbon fuel sources has lead to research into sustainable non-polluting energy sources such as waves, wind, tidal, geothermal and solar.

Numerous different types of wave power generation systems have been proposed. One system employs the basic principle of using the vertical motion inherent in the movement of waves to effect a rotary movement of a turbine to drive directly or indirectly a generator to produce electricity. In such systems, there is frequently reversing air flow conditions present, caused by the oscillatory motion of the waves. A number of specially configured unidirectional turbines have been designed to allow the turbine to continue operating in response to such reversing air flow conditions.

However, many, if not all, of these prior systems operate at a relatively low efficiency due to losses in the system when converting the oscillatory motion of the waves into rotational mechanical energy.

In addition, many prior wave power generation systems are heavily reliant upon the direction of travel of the prevailing ocean wave. Furthermore, many existing wave power generation systems are moored to constantly face in one direction and therefore operate below optimum efficiency for long periods due to changes in wave direction arising from natural tidal changes.

Another disadvantage of many known wave power generation systems operating on the basic principle of using the vertical motion of waves to effect rotary movement of a turbine which in turn drives a generator to produce electricity is that these systems commonly rely on the principle of gravity-induced resonant amplification to ensure efficiency of operation to attain the desired levels of power output. In such systems, it is necessary to convert the oscillatory motion of the water to an airflow. That is, many currently known systems typically require a hydraulic to pneumatic conversion process, further reducing the efficiency of the total energy conversion process.

In addition, many known wave power generation systems must be built to withstand the large and unpredictable forces to which they are subjected from ocean waves. To ensure the sustainability of a system over its working life a level of redundancy is required to be built into the system. For example, ocean power generating systems are commonly required to withstand the forces associated with the large waves of "once in a hundred year storms". The magnitude of the forces in these extreme cases is many times that of the forces arising in most storms and, as such, significant additional costs are necessarily incurred when manufacturing, installing and maintaining the system. It has been found that these additional costs are often so high that they can render systems commercial unviable.

Systems built to withstand the most extreme forces are necessarily larger in size and, consequently, the visual appeal of these systems is reduced. The visual appeal or aesthetics of sustainable energy systems such as ocean wave energy extraction systems is an important factor, not only for reducing the visual impact on the surrounding environment, but also for gaining public acceptance of these alternative means of producing energy.

It is an object of the present invention to overcome or ameliorate one or more of the disadvantages of the prior art, or at least provide a useful alternative.

SUMMARY OF THE INVENTION

According to a first aspect of the invention, there is provided an ocean wave energy extraction system including:

at least one duct for receiving an oscillating water column, the duct having a first segment, a second segment arranged transversely to the first segment and a flow control segment intermediate the first and second segments, the flow control segment being configured to inhibit turbulent flow of the oscillating water column flowing within the duct;

a turbine in fluid communication with the second segment of the duct such that the turbine is driven by a fluid flow from the second segment, the fluid flow being generated by oscillations of the oscillating water column within the duct; and an electric generator configured for rotation by the turbine to generate electrical energy.

Preferably, the flow control segment is a curved segment. The flow control segment preferably has a constant radius of curvature. However, in certain embodiments the radius of curvature may vary. In other embodiments, the flow control segment can include a sloped portion or be otherwise configured to produce a smooth and gradual change in direction of the oscillating water column, thereby inhibiting the extent of turbulent flow within the duct.

The duct is preferably located in a body of water such as an ocean, whereby the water column oscillates in response to the rise and fall of waves passing the duct.

The fluid flow is preferably bi-directional. Preferably, the fluid associated with the fluid flow is one of a gas and a liquid. In certain embodiments, the fluid is air. In these embodiments, the turbine is preferably, but not necessarily, located above the mean surface level of the body of water in which the duct is located. In other embodiments, the fluid is water. In these embodiments, the turbine may be, for example, a water turbine which is preferably, but not necessarily, submerged below the mean surface level of the body of water. Accordingly, it will be appreciated that the turbine may be driven directly or indirectly by the fluid flow associated with the oscillating water column.

The first segment, the second segment and the flow control segment of the duct may be integrally formed as a one-piece unit. Preferably, the duct is an L-shaped pipe. The duct is preferably configured such that, in use, the first segment is arranged in a substantially horizontal orientation and the second segment is arranged in a substantially vertical orientation.

In certain preferred embodiments, the length of the first segment of the duct is greater than the length of the second segment of the duct. In other preferred forms, the length of the second segment is greater than the length of the first segment. In yet further preferred embodiments, the first and second segments are substantially the same length. The length of the first segment of the duct is preferably determined by the formula, $$L = \frac{T^2}{4},$$

where L is the length of the first segment in meters, and T is the period of the waves of an ocean in seconds. In one preferred form, the length of the first segment is approximately 25 m. Preferably, the length of the first segment of the duct is variable for tuning the duct to suit the period of the waves of an ocean. In various embodiments, the first segment of the duct has a telescopic configuration for varying the length of the first segment. The telescopic configuration of the first segment may include a plurality of portions, such as tubes, arranged to facilitate relative sliding movement of the tubes. Each pair of telescopic segments may have a locking means to lock the tubes relative to one another to set the desired length of the first segment of the duct. In other preferred forms, the length of the second segment can be similarly adjustable.

Preferably, the duct has a constant inner cross-sectional area. The inner cross-sectional area is preferably circular. In other embodiments, the inner cross-sectional area may be square or rectangular. It will be appreciated that the inner cross-sectional area of the duct may be any suitable shape, including irregular shapes and may vary in size and shape along the length of the duct or segment. In one preferred form, the inner cross-sectional area has a diameter of approximately 10 m.

Preferably, the turbine operates unidirectionally in response to the bi-directional fluid flow. The turbine may be an air-driven turbine or a water-driven turbine.

The ocean wave energy extraction system may include a mooring system for mooring the duct in a desired location. The mooring system is preferably one of a fixed-mooring system, a floating-mooring system, a tensioned-mooring system and a slack-mooring system.

The ocean wave energy extraction system may include a buoyancy element for facilitating floatation of the or each duct. Preferably, the buoyancy element is laterally mounted to the duct. The buoyancy element may be laterally mounted to one or both sides of the or each duct. More preferably, the buoyancy element may be laterally mounted on one or both sides of the second segment of the duct.

The ocean wave energy extraction system may include a plurality of ducts, each duct being configured to receive an associated oscillating water column. Each of the plurality of ducts may be arranged to face in the same direction relative to the prevailing ocean wave. Alternatively, each duct of the plurality of ducts may be arranged to face a different direction relative to each other and thus relative to the prevailing ocean wave. The ocean wave energy extraction system may include two ducts arranged at 180 degrees to each other such that one duct faces the prevailing ocean wave and the other duct faces away from the ocean wave. The plurality of ducts may be arranged along a common axis. Alternatively, the plurality of ducts may be arranged about a common axis. Preferably, the plurality of ducts are arranged to form one of a linear array and a polar array. In some preferred embodiments, the plurality of ducts includes groups of ducts, whereby two or more groups are arranged to form the array of ducts. In certain embodiments, each group of ducts has the same formation. In other preferred forms, at least one group of ducts has a different formation to one or more of the other groups. Preferably, the ducts of each group are arranged to be one of along or about a common axis.

In one particularly preferred form, each duct is rotated relative to an axis which extends transversely to the common axis along or about which the ducts are arranged. For example, each duct could be rotated by an angle 'α' of, for example, approximately 15 degrees relative to the common axis. It will of course be appreciated that the angle 'α' is not limited to any particular angle and can be selected to suit the particular wave climate of the location where the system is to be installed. In certain embodiments, a first group of ducts are rotated to extend at a first angle relative to the common axis and a second group of ducts are rotated to extend at a second angle relative to the common axis. In one preferred form, the first group of ducts are rotated to extend at an angle of approximately 15 degrees to the common axis and the second group of ducts are rotated to extend at an angle of approximately minus 15 degrees to the common axis.

The ocean wave energy extraction system is preferably configured such that an open end (or inlet) of each duct is substantially at the same depth below the mean surface level of the body of water in which the system is located, in use.

Preferably, a separate turbine is mounted to each duct of the plurality of ducts such that each turbine is independently driven by the oscillating water column of the associated duct.

According to a second aspect of the invention, there is provided a wave amplitude magnification device for an ocean wave energy extraction system, the device including:

a plurality of ducts for magnifying an amplitude of an ocean wave, the plurality of ducts being arranged about a common axis, each duct extending transversely from the common axis and configured to receive an oscillating water column such that oscillation of each water column produces a corresponding fluid flow for driving a turbine.

Each fluid flow produced by the water column may be a liquid flow such as a water flow, or a gas flow such as an airflow. Each fluid flow is preferably bi-directional.

In one preferred form, the wave amplitude magnification device has two ducts arranged about the common axis such that an efficiency of the ocean wave energy extraction system is largely independent of the direction of travel of an ocean wave.

In another particularly preferred form, the wave amplitude magnification device preferably has three ducts arranged about the common axis such that an efficiency of the ocean wave energy extraction system is largely independent of the direction of travel of an ocean wave. Preferably, the three ducts are equally spaced about the common axis at about 120 degrees relative to each other. It will of course be appreciated by those skilled in the art that the number of ducts is not limited to either two or three but may be any suitable number suitable for reducing the effect of wave direction on system performance.

Each bi-directional fluid flow may be used to drive the same turbine. Alternatively, each fluid flow may drive a separate independent turbine. Preferably, the or each turbine rotates unidirectionally in response to the bi-directional fluid flows.

Preferably, the turbine includes a rotor comprising:
a central hub; and
a plurality of straight radially extending aerofoil sectioned blades each connected with the hub, a cross-section of each of the blades being approximately symmetrical about a line defining the maximum camber height and generally constant along its radially extending length,
wherein the approximately symmetrical shape of the blades and their orientation in relation to the hub facilitates unidirectional rotation of the rotor in response to reversing axial fluid flows therethrough.

Each duct preferably has a first segment, a second segment arranged transversely to the first segment and a flow control segment intermediate the first and second segments, the flow control segment being configured to inhibit turbulent flow of the oscillating water column flowing within the duct. Preferably, each first segment is a substantially horizontal segment with an open end (or inlet) facing away from the common axis. Preferably, the plurality of ducts are configured such that the open end (or inlet) of each duct is substantially at the same depth below the mean surface level of the body of water in which the system is located, in use.

According to a third aspect of the invention, there is provided an oscillating water column receiving duct for an ocean wave energy extraction system, the duct including:
a first segment;
a second segment arranged transversely to the first segment; and
a flow control segment intermediate the first and second segments, the flow control segment being arranged to allow fluid communication between the first and second segments and configured to inhibit turbulent fluid flow within the duct.

According to a fourth aspect of the invention, there is provided an ocean wave energy extraction system including:
at least one duct submerged below the mean surface level of a body of water, the at least one duct receiving a water column which oscillates within the duct in response to a pressure differential caused by the rise and fall of waves passing the at least one duct; and
an energy conversion unit in fluid communication with the at least one duct for hydraulically converting energy in the oscillating water column into electrical energy.

In this aspect of the invention, the at least one duct is fully submerged so that the entire duct, including both ends of the duct and an operatively upper surface of the duct, lie completely below the mean surface level of the body of water.

The duct of the fourth aspect of the invention may be straight, L-shaped, U-shaped or any other suitable shape for being submerged below the mean surface level of the body of water.

The energy conversion unit preferably includes a turbine in hydraulic communication with the oscillating water column, the turbine being hydraulically driven by the oscillating water column; and an electric generator configured for rotation by the hydraulically driven turbine to generate the electrical energy.

Preferably, the turbine is a water turbine. The water turbine is preferably configured to operate unidirectionally in response to the bi-directional flow of the oscillating water column. In various embodiments, the water turbine is selected from the group including Denniss-Auld, Wells, Setoguchi, Darrieus and Gorlov turbines. However, it will be appreciated by those skilled in the art that the type of turbine used is not limited to those listed here and that any other suitable turbine can be used.

In certain embodiments, the turbine is arranged such that its axis of rotation is transverse to a longitudinal axis of the duct. In other embodiments, the turbine is arranged such that its axis of rotation is substantially parallel to the longitudinal axis of the duct. In some embodiments, the axis of rotation of the turbine is coaxial with the duct.

In some embodiments, the duct rests on the floor of the body of water. In other embodiments, the duct is preferably held in a desired position and orientation in the body of water by a mooring system. The mooring system may hold the duct at a predetermined height above the floor of the body of water.

To maintain the duct substantially at the predetermined height, the mooring system may include a buoyancy element for facilitating floatation of the duct.

Preferably, the submerged duct is arranged in a substantially horizontal orientation.

The length of the duct is preferably related to the period (and, therefore, wavelength) of waves in the body of water. In certain preferred forms, the length of the duct is in the range of about 25% to 45%, more preferably approximately 37%, of the wavelength of the prevailing waves.

In some preferred embodiments, the length of the duct is variable for tuning the duct to suit the period of the waves, and to allow for changes to the period of the prevailing wave over time. In various embodiments, the duct has a telescopic configuration for varying the length of the duct. The telescopic configuration of the duct may include a plurality of discrete portions, such as tubes, arranged to facilitate relative sliding movement of the tubes to vary the length of the duct. Each pair of telescopic segments preferably has an associated locking means to lock the tubes relative to one another to set the desired length of the duct.

Preferably, the duct has a constant inner cross-sectional area. In some preferred embodiments, the inner cross-sectional area may be square or rectangular. In other embodiments, the inner cross-sectional area is circular. It will be appreciated that the inner cross-sectional area of the duct may be any suitable shape, including irregular shapes. In some embodiments, the cross-sectional area of the duct varies along the length of the duct or along one or more sections of the duct.

In various preferred embodiments, the ocean wave energy extraction system includes two or more ducts arranged to form an array of ducts, each duct in the array being arranged to receive an associated oscillating water column. The two or more ducts are preferably arranged to face in the same direction relative to the prevailing ocean wave. In some preferred embodiments, the two or more ducts are arranged in side-by-side relation. However, in certain embodiments it is advantageous to have an array of ducts in which the two or more ducts are oriented in different directions relative to each other and thus relative to the prevailing ocean wave. In certain embodiments, the ducts can be aligned transversely to each other. In one preferred form, the two or more ducts are substantially perpendicular to each other.

In certain embodiments, each duct in the array of ducts has substantially the same length as the other ducts. In other preferred forms, the array of ducts can include ducts of different lengths to account for waves of different wavelengths.

In some embodiments, the array of ducts is configured such that each of the associated oscillating water columns drive a single turbine. In other embodiments, each oscillating water column, or a group of oscillating water columns, from the respective duct, or group of ducts, drives an associated turbine. In other embodiments, the array of ducts can be formed of discrete groups of ducts, whereby each group has an associated turbine which the group is configured to drive.

Preferably, the system includes a support frame for holding the ducts in relative spaced relation to each other.

According to a fifth aspect of the invention, there is provided a method of extracting energy from an ocean wave, the method including:

placing at least one duct into a body of water such that the duct receives a column of water, the water column oscillating within the duct in response to a pressure differential caused by the rise and fall of waves passing the at least one duct; and hydraulically converting the energy in the oscillating water column into electrical energy.

BRIEF DESCRIPTION OF THE DRAWINGS

Preferred embodiments of the invention will now be described, by way of example only, with reference to the accompanying drawings in which.

DETAILED DESCRIPTION OF THE DRAWINGS

Figure 1:
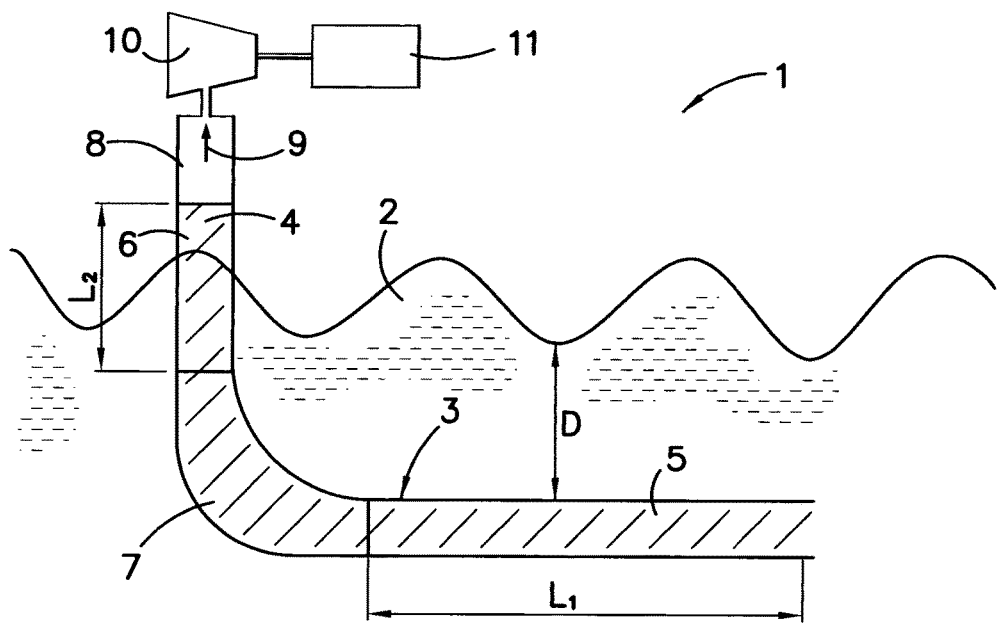
FIG. 1 is a schematic view of an embodiment of an ocean wave energy extraction system according to the invention.

Referring to the drawings, an ocean wave energy extraction system 1 is located in a body of water such as an ocean 2. The ocean wave energy extraction system 1 includes a duct 3 for receiving ocean water to form a water column 4. As will be described in greater detail below, the water column 4 oscillates within the duct 3 in response to the rise and fall of ocean waves moving past the ocean wave energy extraction system 1.

The duct 3 has a first segment 5, a second segment 6 arranged transversely to the first segment and a flow control segment 7 intermediate the first and second segments. As shown in FIG. 1, the duct 3 is substantially L-shaped and constructed such that the first segment 5, the second segment 6 and the flow control segment 7 form a one-piece unit. Each segment of the duct 3 is open at its ends to form a continuous through-bore along the duct. In the embodiment illustrated in the drawings, the bore of the duct has a circular cross-sectional area. However, it will of course be appreciated that in other embodiments the cross-section may be any suitable shape, and may be a constant or varying area.

The duct 3 amplifies the amplitude of each ocean wave passing the ocean wave energy extraction system 1 such that the amplitude of the oscillations of the oscillating water column 4 within the duct is greater than the amplitude of the passing ocean waves.

The length $L_1$ of the first segment 5 of the duct 3 has more influence on the performance of the system 1 than the length $L_2$ of the second segment 6. In particular, the length $L_1$ of the first segment 5 influences the extent to which the amplitude of the ocean waves is amplified by the duct 3. It is preferable that the length $L_1$ of the first segment 5 of the duct is greater than the length $L_2$ of the second segment 6 of the duct.

It has been found that the level of amplification produced by the duct 3 is advantageous when the length of the first segment 5 is related to the period of the ocean waves by the formula, $$L_1 = \frac{T^2}{4},$$

where $L_1$ is the length of the first segment in meters, and T is the period of the ocean waves in seconds. For example, for a wave period of 10 seconds, the preferred length $L_1$ of the first segment 5 of the duct 3 is approximately 25 m.

The flow control segment 7 is curved in a manner to inhibit turbulent flow of the oscillating water column 4 flowing within the duct 3. In particular, the curve of the flow control segment 7 is configured to provide a smooth and gradual change in direction as the water flows from the first segment 5 to the second segment 6. This gradual change in direction reduces the amount of turbulent flow in the oscillating water column 4 as the column flows through the duct. It will be appreciated that there will still be a degree of turbulent flow as the water column 4 moves through the duct 3 from the first segment 5 to the second segment 6 via the curved flow control segment 7, and vice versa. However, the flow control segment 7 reduces the level of turbulent flow through the duct 3 to such an extent that there is a positive impact on the amplification of the amplitude of the ocean waves, as demonstrated by the increase in the oscillations of the water column within the duct. It will be appreciated that this reduction in turbulent flow leads to a corresponding increase in the overall efficiency of energy conversion by the system 1.

In the embodiment illustrated in FIG. 1, the oscillating water column 4 does not fill the entire duct 3 and therefore does not extend to the end of the second segment 6 of the duct. Accordingly, as most clearly shown in FIG. 1, the second segment 6 defines an air, chamber 8 located above the oscillating water column 4. As an ocean wave rises, there is a corresponding upward oscillation of the oscillating water column 4 within the duct 3. This upward oscillation forces the volume of air from the air chamber 8 of the second segment 6 of the duct 3 to create an upward airflow. This upward airflow is indicated in FIG. 1 by arrow 9. Similarly, a downward airflow is generated in response to a downward oscillation of the water column 4 as an ocean wave falls.

It will, however, be appreciated that in other forms, the oscillating water column fills the second segment such that the turbine is directly driven by the water flow. In such embodiments, an output line may connect the second segment of the duct to the turbine.

Returning to FIG. 1, a unidirectional turbine 10 is arranged above the second segment 6 of the duct 3 to be in fluid communication with the second segment 6. The turbine 10 is driven or rotated by the upward and downward airflows. Although the airflow is bi-directional due to the rise and fall of the ocean waves, the turbine 10 is configured to rotate unidirectionally in response to the bi-directional airflow.

An electric generator 11 is coupled to the turbine 10 such that rotation of the turbine causes a corresponding rotation of the generator. The generator is used to generate electrical energy.

In use, the first segment 5 of the duct 3 is submerged in the ocean 2 in a substantially horizontal orientation as shown in FIG. 1. The length $L_2$ of the second segment 6 is greater than the depth D at which the first segment is submerged below the surface of the ocean. As such, the second segment 6 extends through and stands proud of the surface of the ocean to facilitate mounting of the turbine 10 and generator 11.

Figure 2:
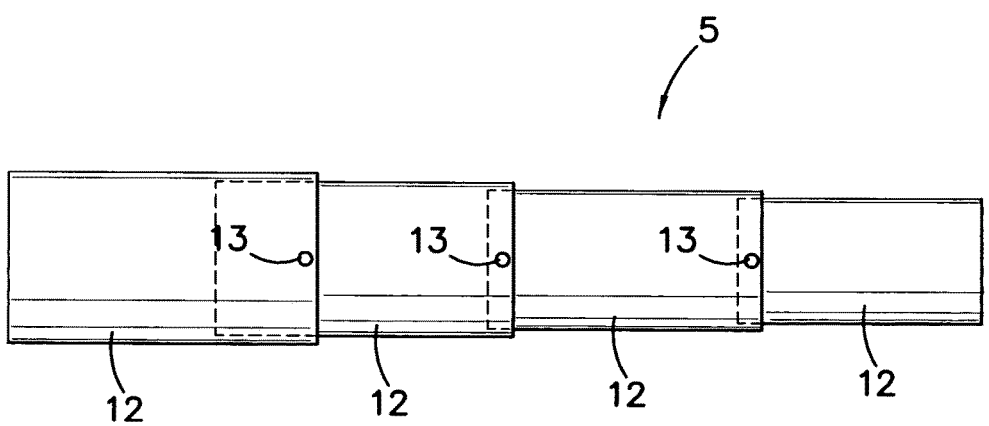
FIG. 2 is a side view of an embodiment of a telescopic segment of a duct for the present ocean wave energy extraction system.

Referring to FIG. 2, it will be appreciated that the period of ocean waves is not constant, but varies from wave to wave and over time the average wave period of a region may also vary. To account for such variations, in certain embodiments the first segment 5 of the duct 3 is configured to be telescopic such that the length $L_1$ is variable to enable the duct 3 to be tuned to suit the period T of the prevailing ocean waves. The telescopic segment 5 shown in FIG. 2 includes a number of tubes 12 fitted within each other to enable relative sliding movement between the tubes 12. A locking means 13 is provided to lock the tubes relative to one another to set the desired length of the first segment 5 of the duct 3.

Figure 3:
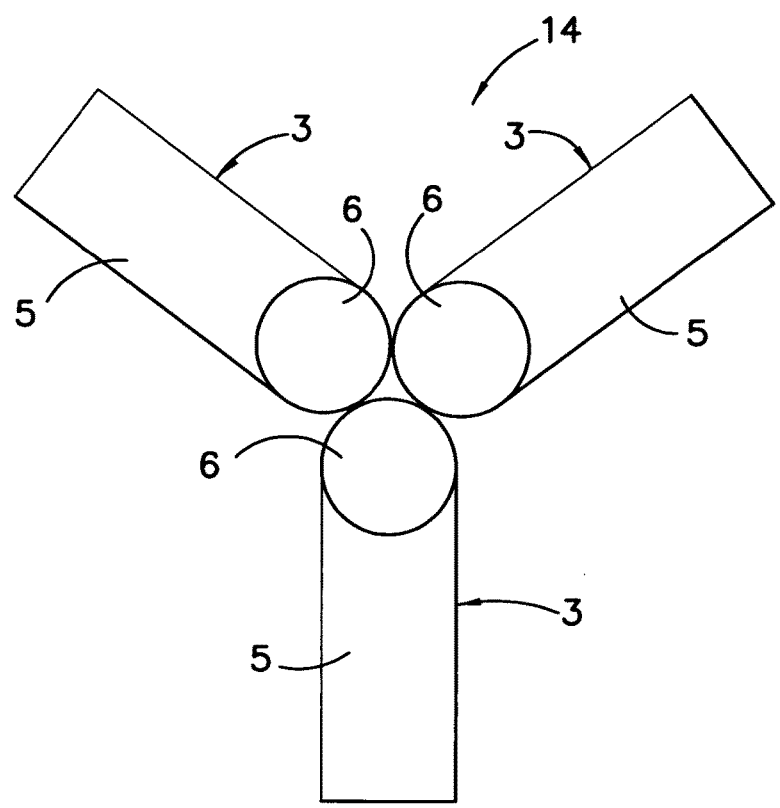
FIG. 3 is a plan view of an embodiment of a plurality of ducts arranged about a common axis.

Referring to FIG. 3, an embodiment of a wave amplitude magnification device 14 for an ocean wave energy extraction system 1 is shown. The wave amplitude magnification device 14 includes three ducts 3 for magnifying the amplitude of ocean waves. The ducts 3 are arranged about a common axis X-X at about 120 degrees relative to each other such that the efficiency of the ocean wave energy extraction system 1 is largely independent of the direction of the prevailing ocean waves.

Each duct 3 is configured to independently receive a volume of ocean water to form an oscillating water column 4. Each water column 4 produces a corresponding bi-directional airflow for driving a turbine 10 of the ocean wave energy extraction system 1.

In the embodiment of FIG. 3, the wave amplitude magnification device 14 will produce three airflows of varying strength. The three airflows are directed to drive the same turbine 10. It will be appreciated that as the direction of travel of the ocean waves changes, the dominant airflow will change accordingly. That is, for a certain wave direction, one of the three ducts 3 will provide the dominant airflow for driving the turbine 10. The other two ducts 3 will also produce an airflow for driving the turbine, but these airflows will not drive the turbine to the extent at which the dominant airflow does. However, it will be appreciated that the combination of the three airflows increases the work done on the turbine and results in a corresponding increase in the amount of electrical energy produced by the generator. As the wave direction changes, the airflow from the ducts will also change such that a different duct 3 will produce the dominant airflow.

Figure 4:
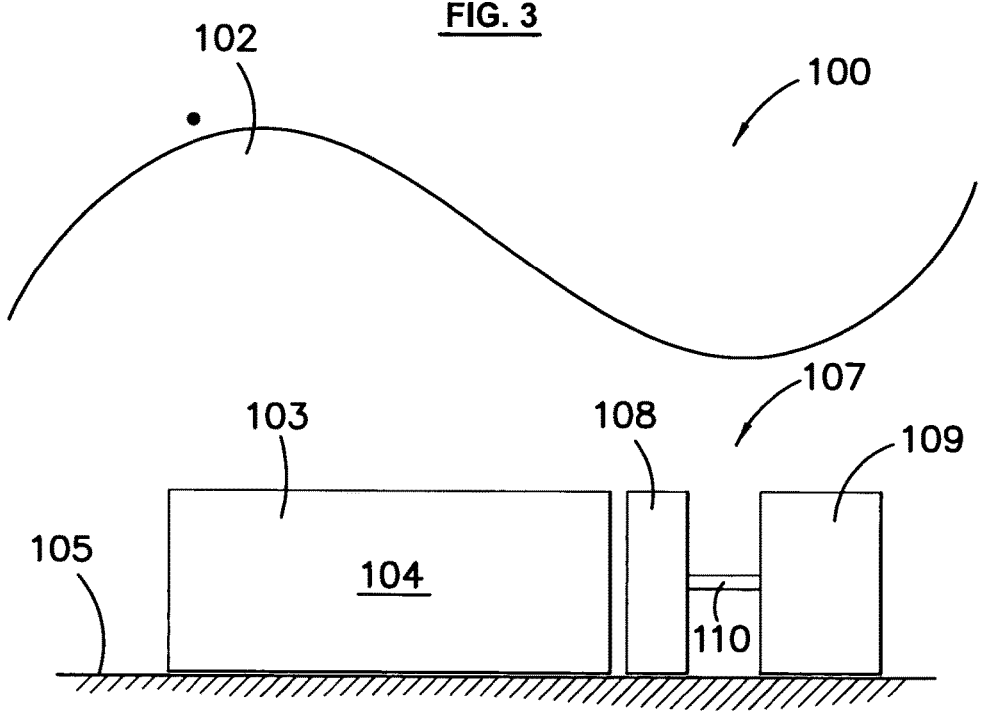
FIG. 4 is a schematic view of another embodiment of an ocean wave energy extraction system according to the invention.
Figure 5:
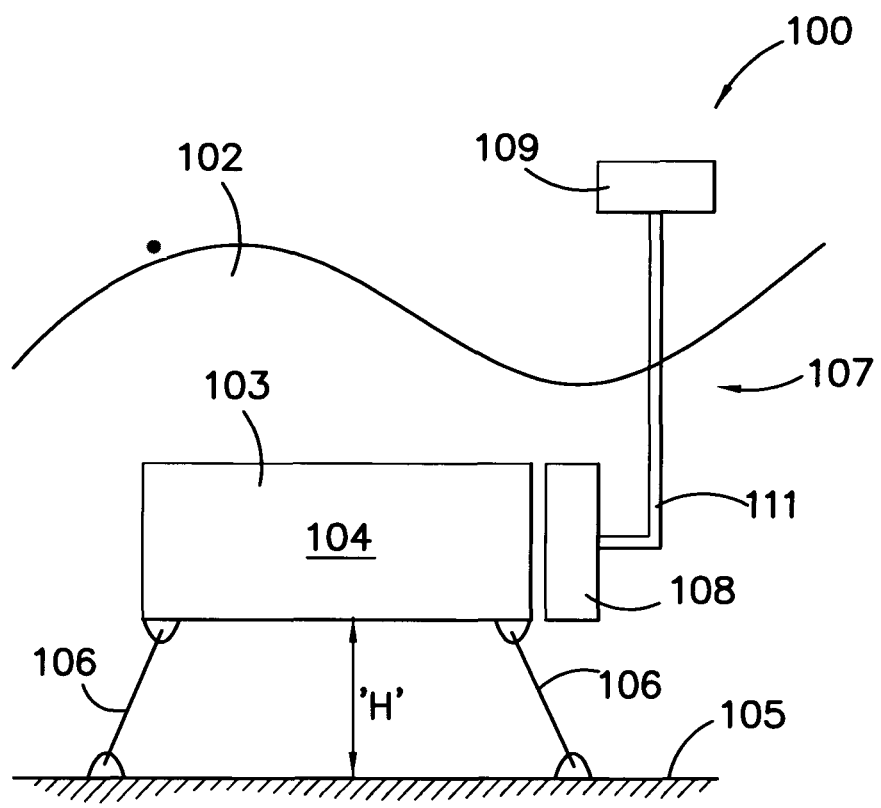
FIG. 5 is a schematic view of another embodiment of an ocean wave energy extraction system according to the invention.
Figure 6:
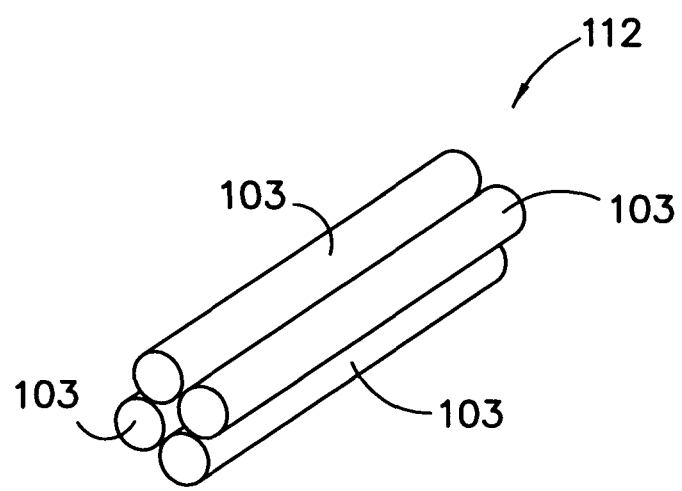
FIG. 6 is a perspective view of an array of ducts arranged substantially perpendicular to each other.

Referring now to FIGS. 4, 5 and 6, there is illustrated another embodiment of an ocean wave energy extraction system 100 according to the invention. The system 100 is again located in a body of water such as an ocean 102 and includes a duct 103 for receiving ocean water to form a water column 104. The duct 103 is entirely submerged below the mean surface level of the ocean 102.

The water column 104 oscillates within the submerged duct 103 in response to a pressure differential caused by the rise and fall of ocean waves moving past the ocean wave energy extraction system 100, more particularly, moving along the length of the duct 103. It will be appreciated that the pressure differential is a result of variations in the head of water along the length of the duct.

It has been found that, in order to achieve advantageous energy conversion and power output from the ocean wave energy extraction system 100, the length of the duct 103 should be approximately 37% of the wavelength of the prevailing ocean waves. However, the duct 103 is not limited to this preferred duct length to wavelength relationship and, it will be appreciated, that the length of the duct 103 will be determined to suit the particular conditions and location in which the ocean wave energy extraction system 100 is to be installed.

In the embodiment of FIG. 4, the submerged duct 103 rests in a substantially horizontal position on the floor 105 of the ocean 102.

In other embodiments, such as that shown in FIG. 5, a mooring system 106 is used to hold the submerged duct 103 in a substantially horizontal position at a predetermined height 'H' above the ocean floor 105.

It is to be appreciated that, although the duct 103 is entirely submerged below the mean surface level of the ocean 102, it is possible that there will be instances in which unusually large waves result in the water level falling to such an extent that the upper portion of the duct 103 is not submerged for a portion of time. This has the effect of producing an air passage and/or air pockets within the duct 103. However, it has been found that the system 100 continues to operate in such circumstances, albeit at a reduced efficiency and lower output. Once the normal wave conditions return, the efficiency and output of the system 100 will also return to normal. This is a particularly advantageous characteristic of the present ocean wave energy extraction system 100.

An energy conversion unit 107 having a water turbine 108 and an electric generator 109 is in fluid communication with the submerged duct 103.

The water turbine 108 is arranged to be in hydraulic communication with the duct 103 such that the turbine 108 is hydraulically driven by the oscillating water column 104. In the embodiments of FIG. 4 and FIG. 5, the water turbine 108 is aligned with the duct 103 so that its axis of rotation is coaxial with the longitudinal axis of the duct 103. However, it will be appreciated that the turbine 108 need not be coaxial with the duct. For example, other types of water turbines in which the axis of rotation is transverse to the longitudinal axis of the duct can also be used.

The water turbine 108 is configured to rotate unidirectionally in response to the reversing or bi-directional flows of the oscillating water column 104. It will be appreciated by those skilled in the art that the unidirectional characteristic of the turbine 108 enhances the efficiency of the ocean wave energy extraction system 100.

The electric generator 109 of the energy conversion unit 107 is driven by the water turbine 108. The electric generator 109 is coupled to the water turbine 108 by a shaft 110 such that rotation of the turbine 108 causes a corresponding rotation of the generator 109. The generator 109 is used to generate electrical energy for supply to an electrical grid.

In the embodiment of FIG. 4, the electrical generator 109 is inline or coaxial with the water turbine 108 such that the duct 103, the water turbine 108 and generator 109 are entirely submerged below the surface of the ocean 102.

In certain applications of the ocean wave energy extraction system 100 such as the embodiment of FIG. 5, it is beneficial to have the electrical generator 109 arranged above the surface of the ocean 102. This can be readily achieved by a suitable mechanical coupling 111 between the turbine 108 and the generator 109. In this embodiment, the water turbine 108 and generator 109 are again entirely submerged below the surface of the ocean 102.

Referring now to FIG. 6, an array 112 of ducts 103 is shown. Each duct 103 in the array 112 is arranged to receive an associated oscillating water column 104. The oscillations of each water column 104 are then used to drive the water turbine 108 of the ocean wave energy extraction system 100. It will be appreciated by those skilled in the art that, the use of a plurality of smaller ducts 103 to form an array 112 of ducts is advantageous when installing the system, as handling of the individual ducts is relatively easier. It will also be appreciated that ducts of different lengths could also be used to form the array.

Those skilled in the art will appreciate that, by submerging the duct 103 below the surface of the ocean 102, the duct 103 will not be subjected to the large and unpredictable dynamic forces arising when ocean waves crash into the system. Thus, the level of redundancy required to be built into the system to ensure the sustainability of the system over its working life is dramatically reduced. Consequently, costs associated with the system are significantly decreased and the commercial viability of the system is increased.

Referring now to the embodiment shown in FIGS. 7 to 10, the illustrated ocean wave energy extraction system 201 is located in a body of water such as an ocean 202. The system 201 includes an array of eight L-shaped ducts 203. Each duct 203 has a first generally horizontal segment 205 and a second generally vertical segment 206 extending transversely from the first segment, to form the L-shape. A flow control segment in the form of a sloped portion 207 is arranged at the junction of each duct to reduce or inhibit turbulent flow within the associated duct.

Figure 9:
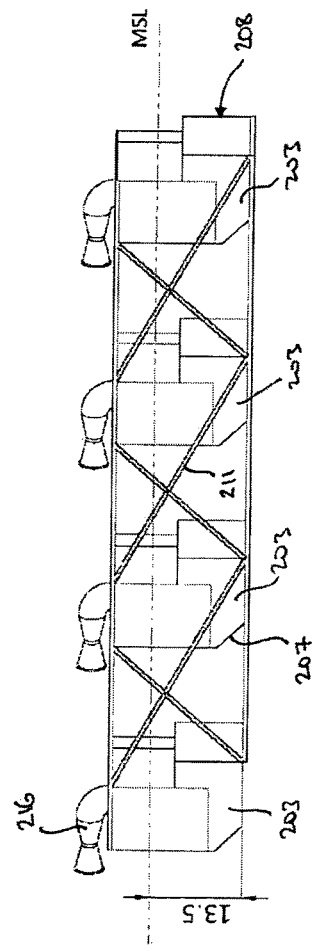
FIG. 9 is a left side view of the ocean wave energy extraction system of FIG. 7.
Figure 10:
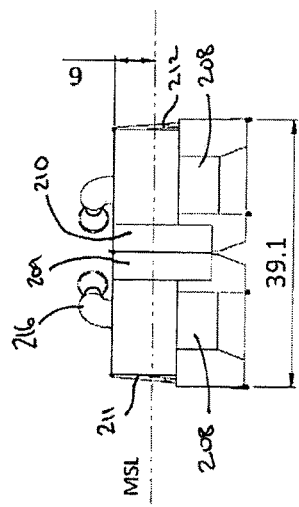
FIG. 10 is an end view of the ocean wave energy extraction system of FIG. 7.

The first segment 205 of each duct 203 has an open end or inlet 208 for receiving water from the body of water, in use. With reference to FIGS. 9 and 10, it can be seen that the array of ducts 203 is configured such that the inlet 208 of each duct 203 is submerged substantially at the same depth below the mean surface level of the body of water. The water received by each duct 203 forms an oscillating water column which drives a separate turbine 216, associated with each duct.

Figure 8:
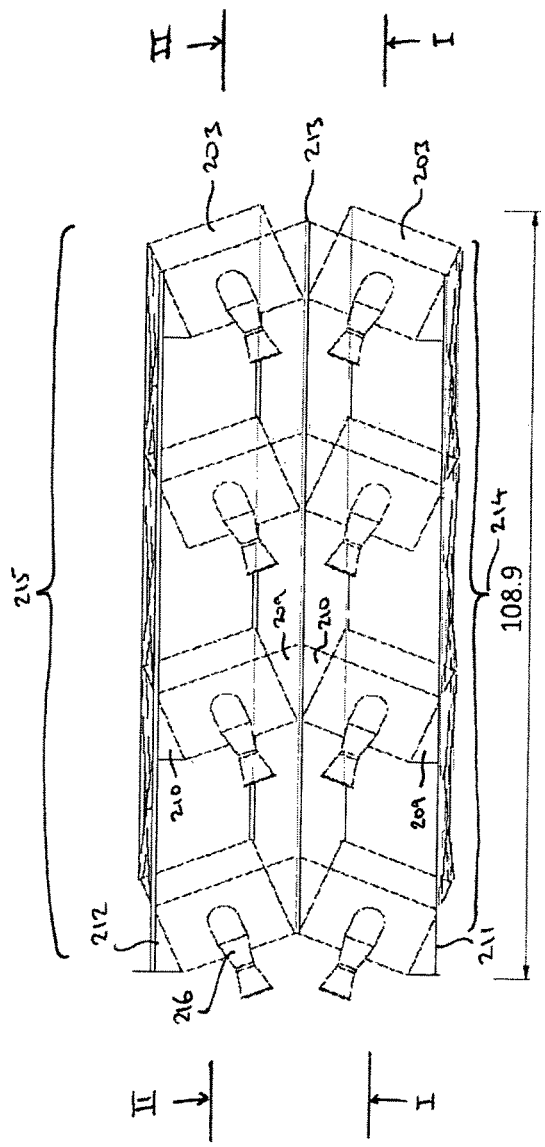
FIG. 8 is a top plan view of the ocean wave energy extraction system of FIG. 7.

Each duct 203 has a buoyancy element for facilitating floatation of the system 201 at a predetermined depth relative to the mean surface level of the body of water. Each buoyancy element is formed of a left buoyancy module 209 and a right buoyancy module 210 which are laterally arranged on the respective left and right outer sidewalls of the associated second segment. With reference to FIG. 8, it can be seen that the buoyancy modules are in the form of wedge-shaped structures so as to aid assembly of the system.

Figure 7:
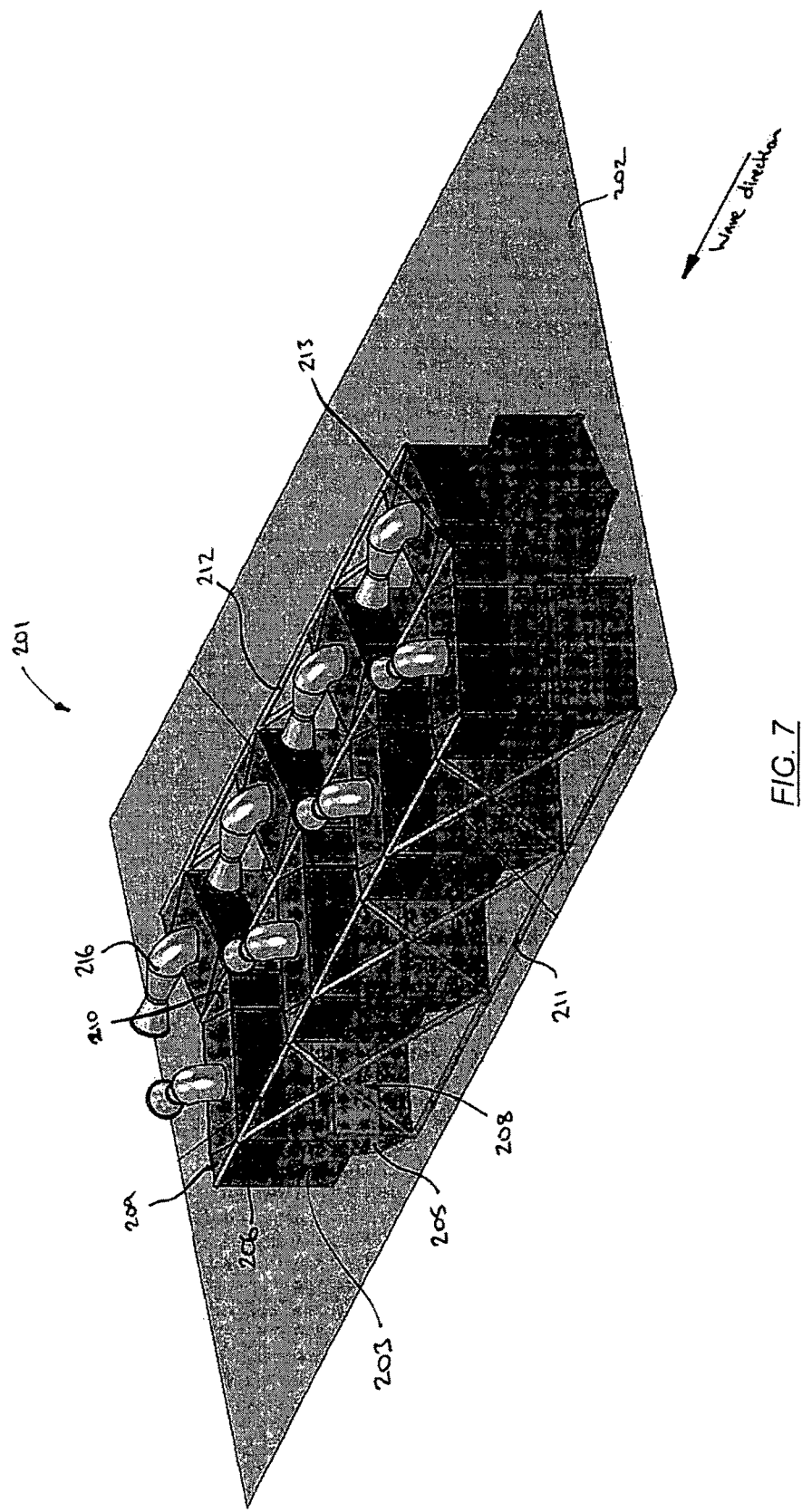
FIG. 7 is a perspective view of a further embodiment of an ocean wave energy extraction system according to the invention.

As is most clearly shown in FIGS. 7 and 9, the ducts 203 are held in relative spaced relation by a support frame structure. The support frame includes two outer brace frames 211, 212 and an inner intermediate brace frame 213.

The system 201 includes a first group 214 and a second group 215 of ducts 203. The first group 214 is arranged along a common axis I-I which extends between, and substantially parallel to, the left outer brace member 211 and the inner brace member 213. As is most clearly shown in FIG. 8, each duct is oriented at an angle 'α' of approximately 15 degrees from the common axis I-I. The second group 215 of ducts is arranged along a common axis II-II which extends between, and substantially parallel to, the inner brace member 213 and the right outer brace member 212. The ducts in the second group 215 are oriented at an angle of approximately minus 15 degrees from the common axis II-II, such that the inlet of the ducts of the second group faces in a different direction to the inlet of the ducts of the first group, and thus in a different direction relative to the prevailing ocean wave. It will be appreciated by those skilled in the art that the effect which wave direction has on the overall efficiency of the system will be reduced by having an array of ducts in which the inlet to certain ducts faces in a different direction relative to the inlet of other ducts in the array. It will be further appreciated that the actual angle at which the ducts 203 are rotated relative to the common axis is not limited to plus/minus 15 degrees, but will be determined to best suit the local wave climate conditions.

Accordingly, it is an advantage of at least a preferred embodiment of the invention to provide an ocean wave energy extraction system in which the level of turbulent flow is reduced such that the system is more efficient at generating electricity.

It is another advantage of at least a preferred embodiment of the invention to provide a wave amplification magnification device for an ocean wave energy extraction system which reduces the effect of wave direction on system efficiency.

It is a further advantage of at least a preferred embodiment of the invention to provide an ocean wave energy extraction system in which one or more of the main components of the system is/are entirely submerged below the surface of the ocean such that these components are largely protected from the relatively large, inconsistent and unpredictable dynamic forces associated with the prevailing ocean waves. Advantageously, the submerged duct and other elements of the system require less reinforcement as they are not required to withstand forces which are known to occur only in extremely rare storms, thus substantially reducing the manufacturing, installation and on-going maintenance costs of the system.

It is yet a further advantage of at least a preferred embodiment of the present invention to provide an ocean wave energy extraction system which uses a hydraulic conversion process to efficiently and effectively convert energy in an oscillating water column into electrical energy.

It is yet still a further advantage of at least a preferred embodiment of the present invention to provide an ocean wave energy extraction system which reduces the visual impact on the surrounding environment.

Although the invention has been described with reference to specific examples it will be appreciated by those skilled in the art that the invention may be embodied in many other forms.

The invention claimed is:

1. A forward facing ocean wave energy extraction system, including:
   at least one duct having a first segment and a second segment arranged transversely to the first segment;
   wherein the first segment has an inlet and is submerged below the mean surface level of a body of water with the inlet facing towards a prevailing ocean wave, whereby an oscillating water column oscillates within the duct;

wherein the first segment of the duct has a telescopic configuration for varying the length of the first segment;

wherein the second segment extends from the submerged first segment such that an end wall of the second segment is above the mean surface level of the body of water;

the duct further including a flow control segment intermediate the first and second segments, the flow control segment defined by a planar sloped portion arranged at the junction of, and extending between, the first and second segments of the duct such that the sloped portion inhibits turbulent flow of the oscillating water column flowing within the duct;

a turbine housing mounted to the end wall of the second segment of the duct, the turbine housing extending away from the prevailing ocean wave;

an air-driven turbine housed within the turbine housing so as to be in fluid communication with the second segment of the duct, the turbine being directly driven to rotate unidirectionally by a bidirectional airflow generated by oscillations of the oscillating water column within the duct; and an electric generator configured for rotation by the turbine to generate electrical energy.

2. An ocean wave energy extraction system as claimed in claim 1, wherein a length of the first segment of the duct is greater than a length of the second segment of the duct.

3. An ocean wave energy extraction system as claimed in claim 1, wherein the length of the first segment of the duct is variable for tuning the duct to suit the period of the waves of an ocean.

4. An ocean wave energy extraction system as claimed in claim 1, wherein the turbine includes a rotor comprising:

a central hub and a plurality of aerofoil sectioned blades each connected with the hub, wherein the shape of the blades and their orientation in relation to the hub facilitates unidirectional rotation of the rotor in response to reversing axial fluid flows therethrough.

5. An ocean wave energy extraction system as claimed in claim 1, further comprising a mooring system operable to hold the duct in a desired location at a predetermined height above the floor of the body of water in which it is disposed.

6. An ocean wave energy extraction system as claimed in claim 5, further comprising a buoyancy element for facilitating floatation of the duct above the floor of the body of water in which it is disposed.

7. An ocean wave energy extraction system as claimed in claim 1, wherein the duct is operable to rest on the floor of the body of water in which it is disposed.

8. An ocean wave energy extraction system as claimed in claim 1, including a plurality of ducts arranged along a common axis, each duct being configured to receive an associated oscillating water column.

9. An ocean wave energy extraction system according to claim 8 wherein the plurality of ducts is arranged into groups of ducts.

10. An ocean wave energy extraction system according to claim 9 wherein each group of ducts has the same formation.

11. An ocean wave energy extraction system according to claim 9 wherein the ducts of each group are arranged to be one of along or about a common axis.

12. An ocean wave energy extraction system according to claim 1, wherein the submerged first segment is arranged such that the inlet is angled to the prevailing ocean wave direction at an angle in the range of −15 degrees to +15 degrees.

* * * * *